United States Patent
Moon et al.

(10) Patent No.: US 8,861,463 B2
(45) Date of Patent: Oct. 14, 2014

(54) APPARATUS AND METHOD FOR PERFORMING AN UPLINK HARQ IN A WIRELESS COMMUNICATION SYSTEM

(75) Inventors: Sung Ho Moon, Anyang-si (KR); Min Seok Noh, Anyang-si (KR); Jae Hoon Chung, Anyang-si (KR); Seung Hee Han, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 13/517,242

(22) PCT Filed: Dec. 22, 2010

(86) PCT No.: PCT/KR2010/009183
§ 371 (c)(1),
(2), (4) Date: Jun. 19, 2012

(87) PCT Pub. No.: WO2011/078568
PCT Pub. Date: Jun. 30, 2011

(65) Prior Publication Data
US 2012/0307758 A1 Dec. 6, 2012

Related U.S. Application Data

(60) Provisional application No. 61/289,369, filed on Dec. 22, 2009, provisional application No. 61/306,911, filed on Feb. 22, 2010, provisional application No. 61/321,141, filed on Apr. 6, 2010, provisional application No. 61/321,874, filed on Apr. 8, 2010, provisional application No. 61/357,997, filed on Jun. 24, 2010.

(30) Foreign Application Priority Data

Dec. 21, 2010 (KR) .................. 10-2010-0131515

(51) Int. Cl.
*H04W 4/00* (2009.01)
*H04L 5/00* (2006.01)
*H04L 1/18* (2006.01)
*H04W 72/12* (2009.01)

(52) U.S. Cl.
CPC ......... *H04L 5/0007* (2013.01); *H04W 72/1284* (2013.01); *H04L 5/0053* (2013.01); *H04L 1/1861* (2013.01); *H04L 1/1812* (2013.01); *H04L 1/1854* (2013.01); *H01L 5/0055* (2013.01)
USPC ........................................ 370/329

(58) Field of Classification Search
CPC ....... H04L 5/0053; H04L 5/0055; H04L 1/18; H04L 1/1861; H04W 72/1284
USPC ................................. 370/329, 341
See application file for complete search history.

(56) References Cited

U.S. PATENT DOCUMENTS

2010/0208679 A1* 8/2010 Papasakellariou et al. ... 370/329
2010/0254268 A1* 10/2010 Kim et al. ..................... 370/241

(Continued)

OTHER PUBLICATIONS

Panasonic, "Further considerations on PHICH Linkage for carrier aggregation", R1-092534, 3GPP TSG RAN WG1 Meeting #57bis, Jun. 2009.

(Continued)

*Primary Examiner* — Gary Mui
(74) *Attorney, Agent, or Firm* — Lee, Hong, Degerman, Kang & Waimey

(57) ABSTRACT

Provided are an apparatus and method of performing an uplink hybrid automatic repeat request (HARQ) in a wireless communication system. A terminal transmits a transport block to a base station via a physical uplink shared channel (PUSCH) using uplink resource allocation and receives an ACK/NACK signal for the transport block from the base station via a physical hybrid-ARQ indicator channel (PHICH). A PHICH resource used for transmitting the PHICH is identified from a PUSCH resource used for transmitting the PUSCH, and the PUSCH resource is mapped to the PHICH resource according to an uplink element carrier through which the transport block is transmitted.

8 Claims, 16 Drawing Sheets

(56) References Cited

U.S. PATENT DOCUMENTS

| | | | |
|---|---|---|---|
| 2010/0254327 A1* | 10/2010 | McBeath et al. | 370/329 |
| 2010/0322158 A1* | 12/2010 | Lee et al. | 370/329 |
| 2011/0103247 A1* | 5/2011 | Chen et al. | 370/252 |
| 2011/0141985 A1* | 6/2011 | Larsson et al. | 370/329 |
| 2012/0039285 A1* | 2/2012 | Seo et al. | 370/329 |
| 2012/0320839 A1* | 12/2012 | Noh et al. | 370/329 |

OTHER PUBLICATIONS

Qualcomm Europe, "UL HARQ Feedback for Multicarrier Operation", R1-092709, 3GPP TSG RAN WG1 #57bis, Jun. 2009.

Samsung, "PHICH Mapping in Asymmetric Carrier Aggregation", R1-094080, 3GPP TSG RAN WG1 Meeting #58bis, Oct. 2009.

LG Electronics, "Issues on DL ACK/NACK in Carrier Aggregation", R1-094160, 3GPP TSG RAN WG1 Meeting #58bis, Oct. 2009.

* cited by examiner

FIG. 6
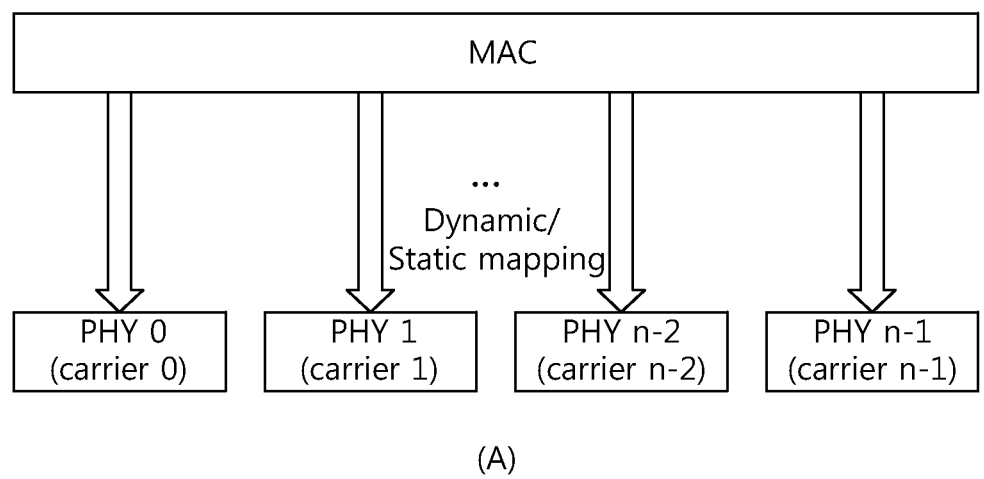
(A)
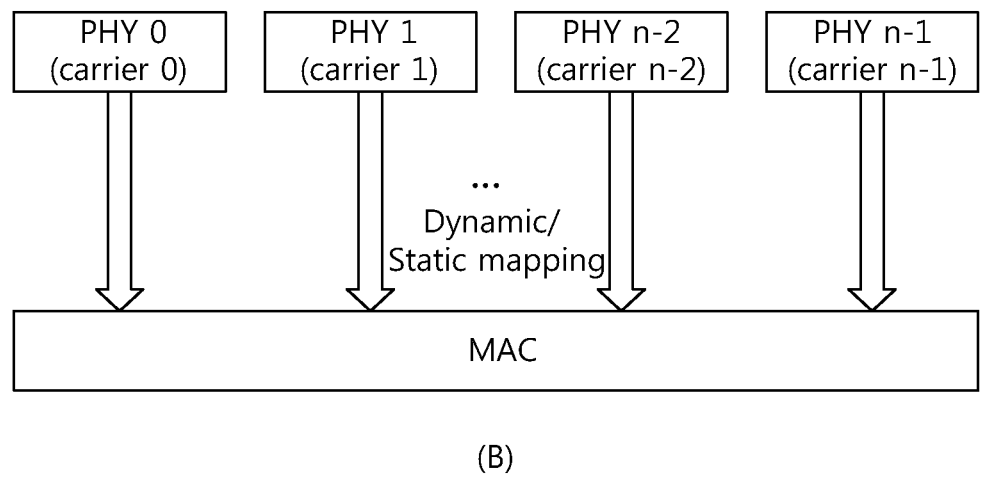
(B)

FIG. 7
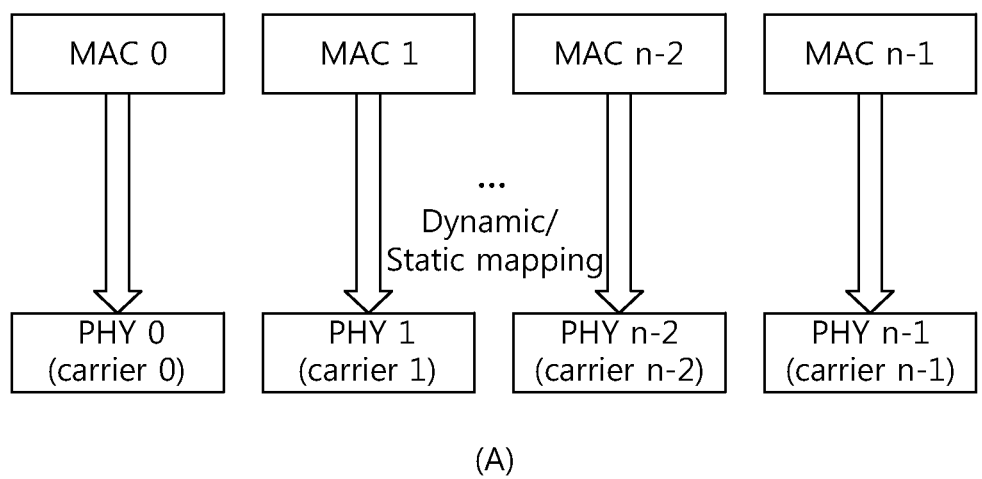
(A)
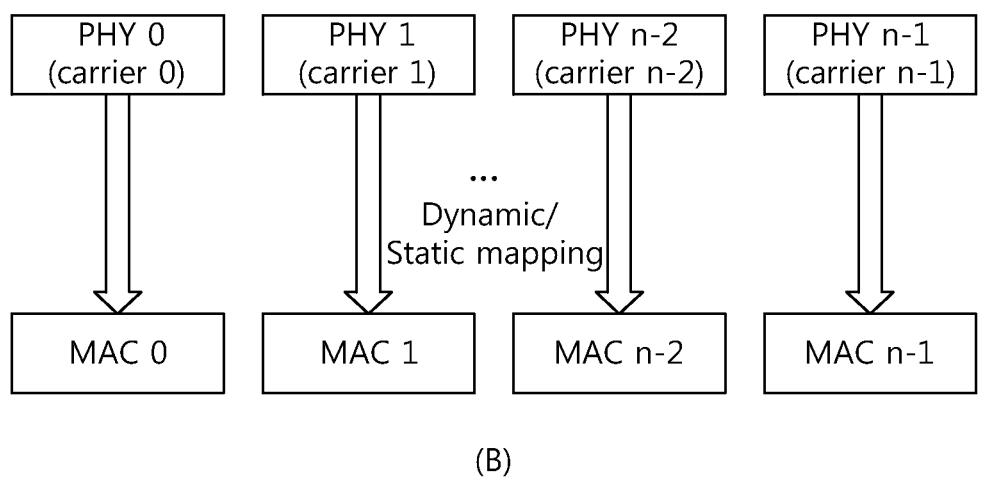
(B)

FIG. 8
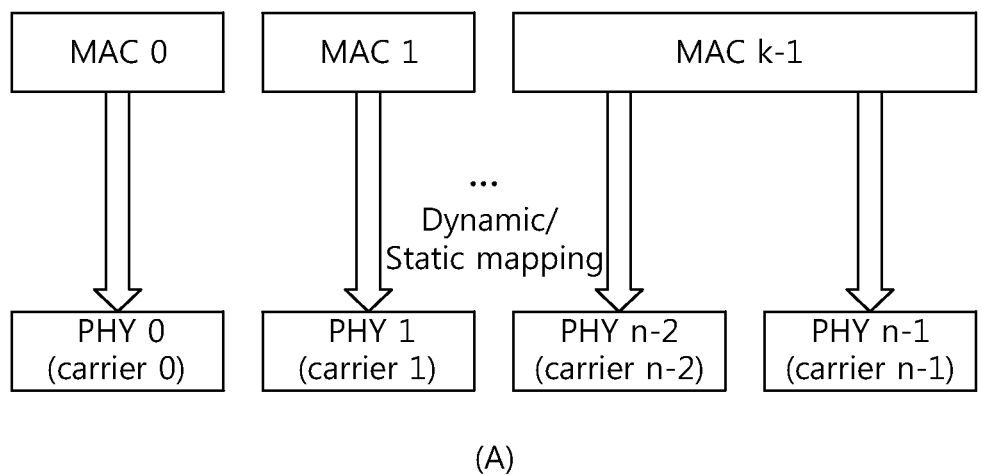
(A)
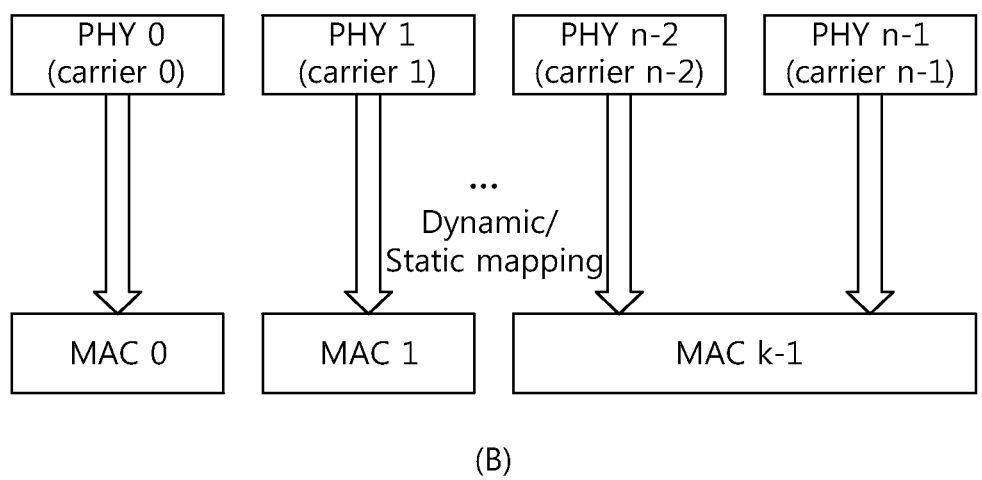
(B)

APPARATUS AND METHOD FOR PERFORMING AN UPLINK HARQ IN A WIRELESS COMMUNICATION SYSTEM

CROSS-REFERENCE TO RELATED APPLICATIONS

This application is the National Stage filing under 35 U.S.C. 371 of International Application No. PCT/KR2010/009183, filed on Dec. 22, 2010, which claims the benefit of earlier filing date and right of priority to Korean Application No. 10-2010-0131515, filed on Dec. 21, 2010, and also claims the benefit of U.S. Provisional Application Ser. No. 61/357,997, filed on Jun. 24, 2010, U.S. Provisional Application Ser. No. 61/321,874, filed on Apr. 8, 2010, U.S. Provisional Application Ser. No. 61/321,141, filed on Apr. 6, 2010, U.S. Provisional Application Ser. No. 61/306,911, filed on Feb. 22, 2010, and U.S. Provisional Application Ser. No. 61/289,369, filed on Dec. 22, 2009, the contents of which are all incorporated by reference herein in their entirety.

TECHNICAL FIELD

The present invention relates to wireless communications, and more particularly, to an apparatus and method for performing an uplink hybrid automatic repeat request (HARQ) in a wireless communication system.

BACKGROUND ART

An error compensation scheme is used to secure communication reliability. Examples of the error compensation scheme include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

If the error is not detected from the received data, a receiver transmits a positive-acknowledgement (ACK) signal as a reception acknowledgement to report to a transmitter that reception is successful. If the error is detected from the received data, the receiver transmits a negative-acknowledgement (NACK) signal as the reception acknowledgement to report to the transmitter that the error is detected. The transmitter can retransmit the data upon receiving the NACK signal.

Long term evolution (LTE) based on $3^{rd}$ generation partnership project (3GPP) technical specification (TS) release 8 is a most dominant next mobile communication standard.

The 3GPP LTE supports hybrid automatic repeat request (HARQ) in both uplink transmission and downlink transmission. Downlink HARQ implies that, when a base station (BS) transmits downlink data, a user equipment (UE) transmits an ACK/NACK signal for the downlink data. Uplink HARQ implies that, when the UE transmits uplink data, the BS transmits an ACK/NACK signal for the uplink data.

In recent years, there is an ongoing discussion on 3GPP LTE-advanced (LTE-A) that is an evolution of the 3GPP LTE. An LTE-A system employs new techniques such as carrier aggregation, relay, and uplink multiple input multiple output (MIMO).

The carrier aggregation is used to flexibly extend an available bandwidth. The 3GPP LTE uses one component carrier, and supports up to a 20 MHz bandwidth. The carrier aggregation includes a technique for supporting a 100 MHz system bandwidth by using a plurality of component carriers and a technique for allocating an asymmetric bandwidth between an uplink and a downlink.

In control channels of the 3GPP LTE, an HARQ is designed based on a single carrier component. With the introduction of the carrier aggregation, there is a need for a method capable of performing the HARQ by using a plurality of component carriers.

SUMMARY OF INVENTION

Technical Problem

The present invention provides a method and apparatus for performing an uplink hybrid automatic repeat request (HARQ) in a wireless communication system.

Technical Solution

In an aspect, a method of performing an uplink hybrid automatic repeat request (HARQ) in a wireless communication system is provided. The method includes receiving an uplink grant including an uplink resource allocation from a base station, transmitting a transport block through a physical uplink shared channel (PUSCH) to the base station by using the uplink resource allocation, and receiving, a ACK/NACK signal for the transport block through a physical hybrid-ARQ indicator channel (PHICH) from the base station. A PHICH resource used for transmission of the PHICH is identified from a PUSCH resource used for transmission of the PUSCH, and the PUSCH resource is mapped to the PHICH resource according to an uplink component carrier through which the transport block is transmitted.

The PHICH resource may include a PHICH group and an orthogonal sequence index in the PHICH group, and the PUSCH resource may be mapped to the PHICH group according to the uplink component carrier.

The PUSCH resource may be mapped to the PHICH group in a forward direction or a reverse direction according to the uplink component carrier.

A start point at which the PUSCH resource is mapped to the PHICH group may differ depending on the uplink component carrier.

In another aspect, an apparatus for performing an uplink hybrid automatic repeat request (HARQ) in a wireless communication system is provided. The apparatus includes a radio frequency (RF) unit for transmitting and receiving a radio signal, and a processor coupled to the RF unit and configured for receiving an uplink grant including an uplink resource allocation from a base station, transmitting a transport block through a physical uplink shared channel (PUSCH) to the base station by using the uplink resource allocation and receiving a ACK/NACK signal for the transport block through a physical hybrid-ARQ indicator channel (PHICH) from the base station. A PHICH resource used for transmission of the PHICH is identified from a PUSCH resource used for transmission of the PUSCH, and the PUSCH resource is mapped to the PHICH resource according to an uplink component carrier through which the transport block is transmitted.

In still another aspect, a method for performing an uplink hybrid automatic repeat request (HARQ) in a wireless communication system is provided. The method includes receiving a semi-persistent scheduling (SPS) period from a base station, receiving an SPS activation from the base station, transmitting a transport block through a physical uplink shared channel (PUSCH) at the SPS period to the base station, and receiving a ACK/NACK signal for the transport block through a physical hybrid-ARQ indicator channel (PHICH) by the user equipment from the base station. A PHICH resource used for transmission of the PHICH is identified from a PUSCH resource used for transmission of the PUSCH and an uplink component carrier through which the transport block is transmitted.

Advantageous Effects

A possibility of collision of physical hybrid-ARQ indicator channel (PHICH) resources can be reduced, and backward compatibility with a legacy system can be maintained.

DESCRIPTION OF DRAWINGS

FIG. 6 shows an example of operating multiple carriers by one medium access control (MAC).

FIG. 7 shows an example of operating multiple carriers by multiple MACs.

FIG. 8 shows an example of a transmitter for operating multiple carriers by multiple MACs.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Figure 1:
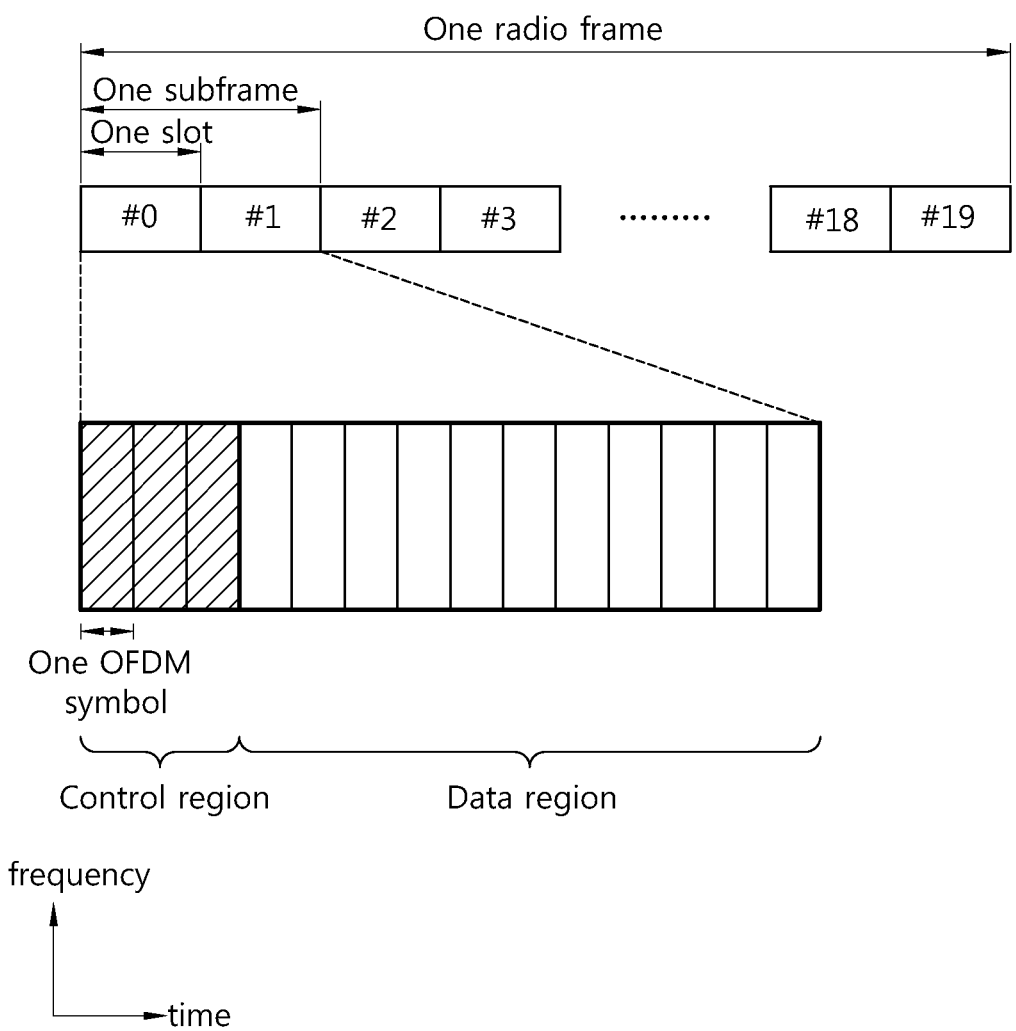
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 20 subframes indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having its DCI.

In order to receive DL data, the UE first receives a DL grant on the PDCCH. DL data on the PDSCH is received by using the DL grant. In addition, to transmit UL data, the UE first receives a UL grant on the PDCCH. UL data is transmitted on the PUSCH by using the UL grant.

A physical broadcast channel (PBCH) is transmitted in first four OFDM symbols in a $2^{nd}$ slot of a $1^{st}$ subframe of a radio frame. The PBCH carries system information necessary for communication between a UE and a BS. The system information transmitted through the PBCH is referred to as a master information block (MIB). In comparison thereto, system information transmitted through the PDCCH is referred to as a system information block (SIB).

The PHICH carries a positive-acknowledgement (ACK)/negative-acknowledgement (NACK) signal for UL hybrid automatic repeat request (HARQ). The ACK/NACK signal for UL data transmitted by the UE is transmitted through the PHICH.

3GPP LTE uses synchronous HARQ in UL transmission, and uses asynchronous HARQ in DL transmission. Retransmission timing is fixed in the synchronous HARQ, and is not fixed in the asynchronous HARQ. That is, in the synchronous HARQ, initial transmission and retransmission are performed based on an HARQ period.

Figure 2:
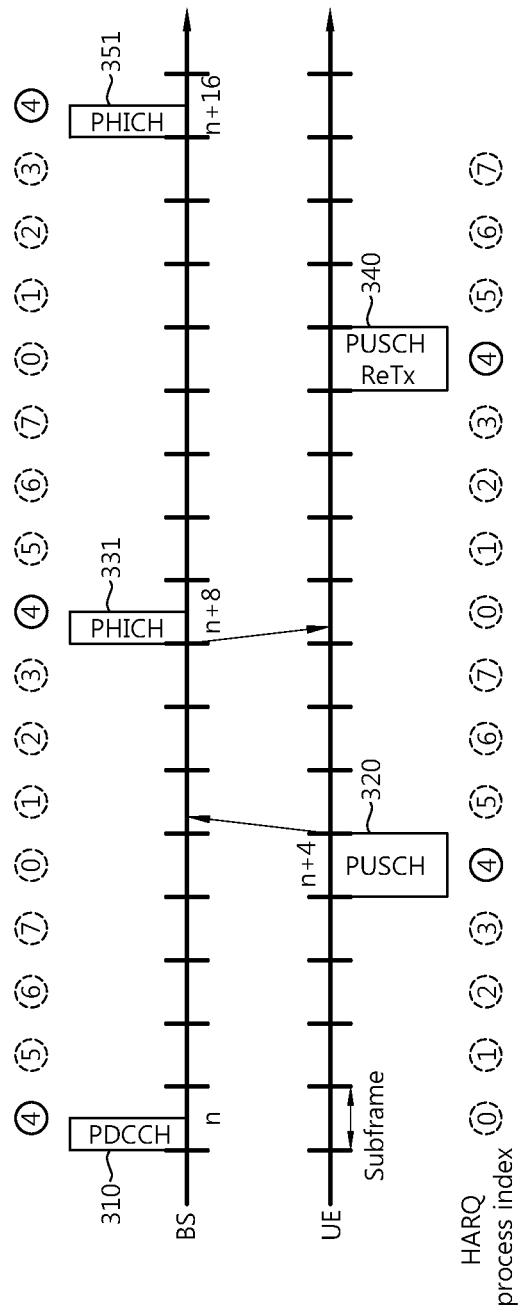
FIG. 2 shows a synchronous uplink hybrid automatic repeat request (HARQ) in 3GPP LTE.

FIG. 2 shows a synchronous UL HARQ in 3GPP LTE.

A UE receives a UL grant including an initial UL resource allocation on a PDCCH 310 from a BS in an $n^{th}$ subframe.

The UE transmits a UL transport block on a PUSCH 320 by using the initial UL resource allocation in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure.

Upon receiving the NACK signal, the UE sends a retransmission block on a PUSCH 340 in an $(n+12)^{th}$ subframe.

The BS sends an ACK/NACK signal for the UL transport block on a PHICH 351 in an $(n+16)^{th}$ subframe.

After initial transmission performed in the $(n+4)^{th}$ subframe, retransmission is performed in the $(n+12)^{th}$ subframe, and thus a synchronous HARQ is performed with an HARQ period corresponding to 8 subframes.

Therefore, in the 3GPP LTE, 8 HARQ processes can be performed, and the respective HARQ processes are indexed from 0 to 7. The aforementioned example shows a case where the HARQ is performed at an HARQ process index 4.

In the synchronous HARQ, when the UE transmits a transport block through a PUSCH in an $n^{th}$ subframe, an ACK/NACK signal is received in an $(n+k_{PHICH})^{th}$ subframe. In frequency division multiplex (FDD) of 3GPP, $k_{PHICH}=4$. In time division multiplex (TDD) of 3GPP, $k_{PHICH}$ is given as shown in Table 1 below according to a UL/DL configuration.

TABLE 1

| TDD UL/DL configuration | UL subframe index n | | | | | | | | | |
|---|---|---|---|---|---|---|---|---|---|---|
|  | 0 | 1 | 2 | 3 | 4 | 5 | 6 | 7 | 8 | 9 |
| 0 |  |  | 4 | 7 | 6 |  |  | 4 | 7 | 6 |
| 1 |  |  | 4 | 6 |  |  |  | 4 | 6 |  |
| 2 |  |  | 6 |  |  |  |  | 6 |  |  |
| 3 |  |  | 6 | 6 | 6 |  |  |  |  |  |
| 4 |  |  | 6 | 6 |  |  |  |  |  |  |
| 5 |  |  | 6 |  |  |  |  |  |  |  |
| 6 |  |  | 4 | 6 | 6 |  |  | 4 | 7 |  |

Figure 3:
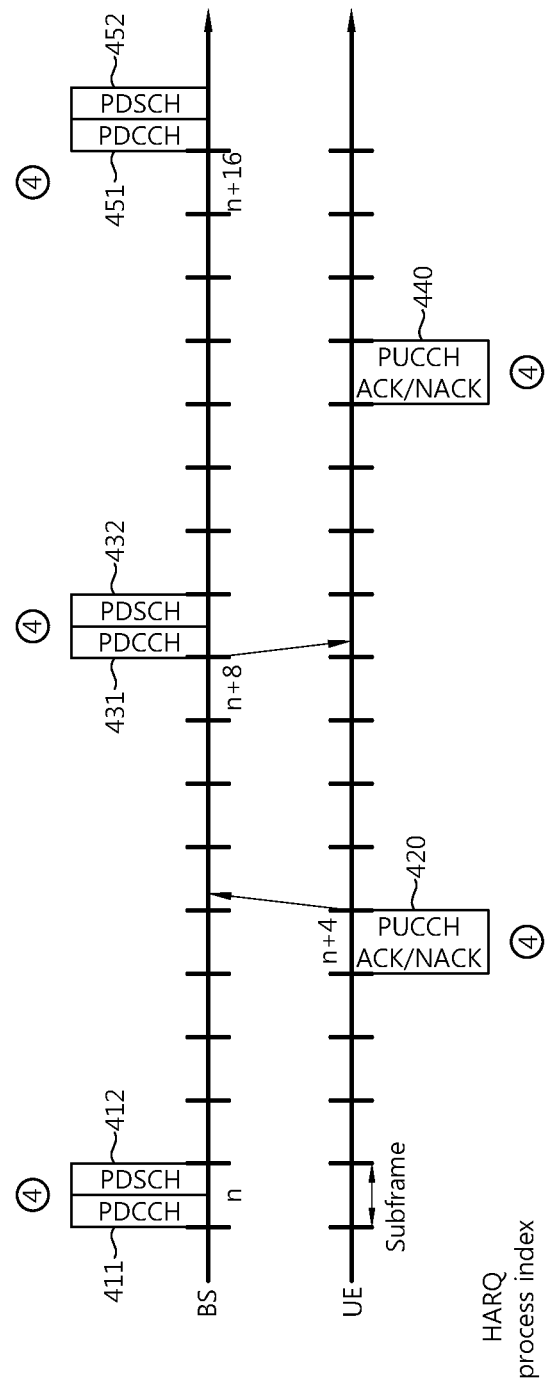
FIG. 3 shows an asynchronous downlink HARQ in 3GPP LTE.

FIG. 3 shows an asynchronous DL HARQ in 3GPP LTE.

A BS transmits a DL transport block to a UE on a PDSCH 412 indicated by a DL resource allocation on a PDCCH 411 in an $n^{th}$ subframe.

The UE sends an ACK/NACK signal on a PUCCH 420 in an $(n+4)^{th}$ subframe. A resource of the PUCCH 420 used in transmission of the ACK/NACK signal is determined based on a resource of the PDCCH 411 (e.g., an index of a first CCE used in transmission of the PDCCH 411).

Even if the NACK signal is received from the UE, the BS does not necessarily perform retransmission in an $(n+8)^{th}$ subframe unlike in the UL HARQ. Herein, a retransmission block is transmitted on a PDSCH 432 indicated by a DL resource allocation on a PDCCH 431 in an $(n+9)^{th}$ subframe.

The UE transmits an ACK/NACK signal on a PUCCH 440 in an $(n+13)^{th}$ subframe.

According to asynchronous HARQ, the BS does not necessarily perform retransmission in a predetermined period even if a retransmission request of the UE is received.

In order for the BS and the UE to share an HARQ process index, a DL grant includes not only a DL resource allocation but also the HARQ process index (including an HARQ process index 4 in the present embodiment) and a new data indicator (NDI). The NDI indicates whether a current DL grant is for new transmission or for retransmission. If an NDI value included in the currently received DL grant is toggled from an NDI value included in a previously received DL grant, it indicates a DL grant for new transmission. If the NDI value is not toggled, it indicates a DL grant for retransmission.

Figure 4:
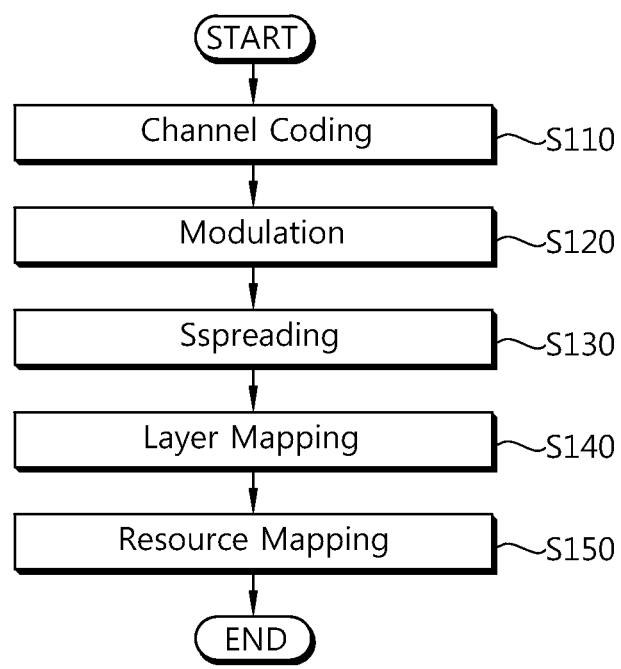
FIG. 4 is a flowchart showing a physical hybrid-ARQ indicator channel (PHICH) configuration.

FIG. 4 is a flowchart showing a PHICH configuration.

Since a 3GPP LTE system does not support single user (SU)-multiple input multiple output (MIMO) in UL transmission, a PHICH carries a 1-bit ACK/NACK signal corresponding to a PUSCH for one UE.

In step S110, the 1-bit ACK/NACK signal is subjected to channel coding by using repetition coding at a code rate of ⅓.

In step S120, the ACK/NACK signal coded with a 3-bit codeword is mapped to 3 modulation symbols by using binary phase shift keying (BPSK).

In step S130, the modulation symbols are spread by using a spreading factor (SF) $N_{SF}^{PHICH}$ and an orthogonal sequence. $N_{SF}^{PHICH}=4$ in a normal CP, and $N_{SF}^{PHICH}=2$ in an extended CP. The number of orthogonal sequences used in the spreading is double of $N_{SF}^{PHICH}$ to apply I/Q multiplexing. $2N_{SF}^{PHICH}$ PHICHs which are spread by using $2N_{SF}^{PHICH}$ orthogonal sequences are defined as one PHICH group. PHICHs belonging to the same PHICH group are identified by using different orthogonal sequences.

In step S140, layer mapping is performed on the spread symbols according to a rank.

In step S150, the layer-mapped symbols are mapped to respective resource elements.

According to the section 6.9 of 3GPP TS 36.211 V8.7.0 (2009-05), a PHICH resource corresponding to a PUSCH is defined by using a lowest physical resource block (PRB) index $I_{PRB\_RA}^{lowest\_index}$ of a resource used in the PUSCH and a cyclic shift parameter $n_{DMRS}$ of a demodulation reference signal (DMRS). The DMRS is a reference signal used for demodulation of a UL transport block transmitted on the PUSCH. The cyclic shift parameter $n_{DMRS}$ is included in DCI (i.e., a UL grant) on a PDCCH for the UL transport block.

More specifically, the PHICH resource is known by an index pair ($n_{PHICH}^{group}$, $n_{PHICH}^{seq}$). $n_{PHICH}^{group}$ denotes a PHICH group number, and $n_{PHICH}^{seq}$ denotes an orthogonal sequence index in the PHICH group. $n_{PHICH}^{group}$ and $n_{PHICH}^{seq}$ are given by Equation 1 below.

$$n_{PHICH}^{group} = (I_{PRB\_RA}^{lowest\_index} + n_{DMRS}) \bmod N_{PHICH}^{group}$$
$$n_{PHICH}^{seq} = (\lfloor I_{PRB\_RA}^{lowest\_index}/N_{PHICH}^{group} \rfloor + n_{DMRS}) \bmod 2N_{SF}^{PHICH}$$
[Equation 1]

Herein, 'mod' denotes a modular operation.

When calculating $n_{PHICH}^{group}$, an item $I_{PHICH}N_{group}^{PHICH}$ may be further added. $I_{PHICH}$ is 1 when a PUSCH is transmitted in a subframe 4 or 9 in a TDD UL/DL configuration 0, and otherwise is 0. $I_{PHICH}N_{group}^{PHICH}$ will be omitted in the following equations.

$n_{PHICH}^{group}$ has a value between 0 and ($N_{PHICH}^{group}-1$), and the number $N_{PHICH}^{group}$ of PHICH groups is defined by Equation 2 below.

$$N_{PHICH}^{group} = \begin{cases} \lceil N_g(N_{RB}^{DL}/8) \rceil & \text{for normal } CP \\ 2\lceil N_g(N_{RB}^{DL}/8) \rceil & \text{for extended } CP \end{cases}$$
[Equation 2]

Herein, $N_g \in \{1/6, 1/2, 1, 2\}$ is determined by a higher layer (e.g., an RRC message).

An orthogonal sequence used in the PHICH is shown in the following table.

TABLE 2

| Sequence Index $n^{seq}_{PHICH}$ | Orthogonal Sequence | |
|---|---|---|
| | Normal CP, $N^{PHICH}_{SF} = 4$ | Extended CP, $N^{PHICH}_{SF} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | |
| 5 | [+j −j +j −j] | |
| 6 | [+j +j −j −j] | |
| 7 | [+j −j −j +j] | |

Now, semi-persistent scheduling (SPS) in 3GPP LTE will be described.

The SPS uses a modulation and coding scheme (MCS) or resource allocation determined according to a predetermined period, in order to transmit a specific amount of traffic such as voice over Internet protocol (VoIP) with a specific period.

Figure 5:
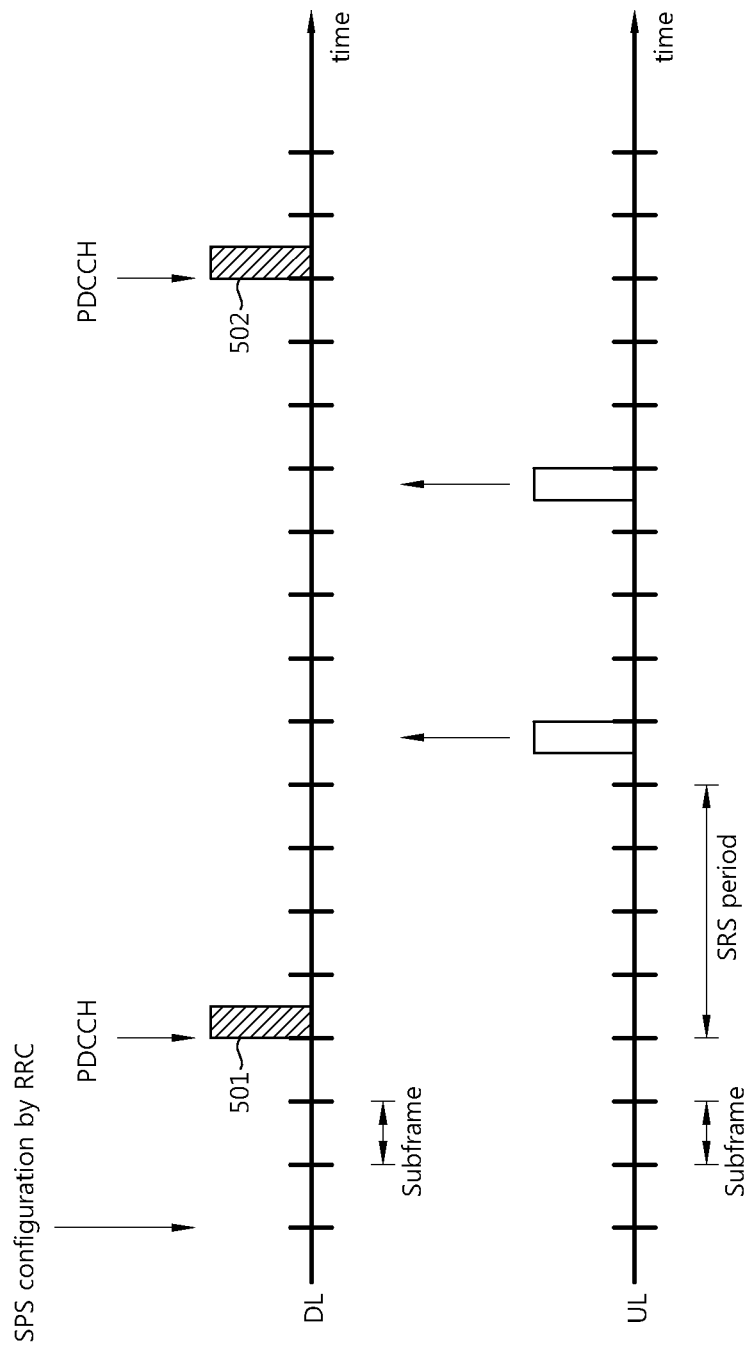
FIG. 5 shows semi-persistent scheduling (SPS) in 3GPP LTE.

FIG. 5 shows SPS in 3GPP LTE. Although a UL SPS case is shown herein, the same also applies to a DL SPS case.

First, a BS sends an SPS configuration to a UE by using radio resource control (RRC). The SPS configuration includes SPS-C-RNTI and an SPS period. It is assumed herein that the SPS period is four subframes.

Even if the SPS is configured, the SPS is not immediately performed. The UE monitors a PDCCH 501 in which a CRC is masked with the SPS-C-RNTI, and performs the SPS after the SPS is activated. When an NDI included in DCI on the PDCCH 501 is 0, combinations of values of several fields (e.g., a transmit power command (TPC), a cyclic shift (CS) of a demodulation reference signal (DMRS), a modulation and coding scheme (MCS), a redundancy version (RV), an HARQ process number, and a resource allocation) included in the DCI are used in SPS activation and deactivation.

When the SPS is activated, even if a UL grant on the PDCCH is not received, the UE can transmit a transport block on the PUSCH according to the SPS period.

Thereafter, the UE monitors a PDCCH 502 in which a CRC is masked with SPS-C-RNTI, and confirms deactivation of the SPS.

If a UL grant corresponding to the SPS-C-RNTI is detected in any subframe n, the following two cases can be taken into account according to an NDI value.

If NDI=1, it is retransmission in the SPS. The UE considers that the NDI is not toggled, and delivers the UL grant and associated HARQ information to an HARQ entity.

If NDI=0, it is initialization in the SPS or SPS release. If the DCI indicates the SPS release, the UE releases the SPS. Otherwise, the UL grant and associated HARQ information are delivered to the HARQ entity by considering that the NDI is toggled. The UE initializes a predetermined UL grant.

Now, a multiple-carrier system will be described.

To support a higher data rate, a multiple-carrier system supporting a plurality of component carriers (CCs) is taken into account.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems. For example, if 5 CCs are assigned as a granularity of a carrier unit having a bandwidth of 20 MHz, a bandwidth of up to 100 MHz can be supported.

In a multi-carrier system, one or more medium access controls (MACs) manage and operate one or more CCs. The CCs managed by the one or more MACs do not have to be contiguous to each other, which results in flexibility in terms of resource management.

FIG. 6 shows an example of operating multiple carriers by one MAC. FIG. 6(A) shows a transmitter, and FIG. 6(B) shows a receiver. One physical layer (PHY) corresponds to one carrier. A plurality of PHYs, i.e., PHY 0, . . . , PHY n−1, are operated by one MAC. Mapping between the MAC and the plurality of PHYs, i.e., PHY 0, . . . , PHY n−1, may be either dynamic mapping or static mapping.

FIG. 7 shows an example of operating multiple carriers by multiple MACs. FIG. 7(A) shows a transmitter, and FIG. 7(B) shows a receiver. Unlike in the embodiment of FIG. 6, a plurality of MACs, i.e., MAC 0, . . . , MAC n−1, are one-to-one mapped to a plurality of PHYs, i.e., PHY 0, . . . , PHY n−1.

FIG. 8 shows an example of a transmitter for operating multiple carriers by multiple MACs. FIG. 8(A) shows a transmitter, and FIG. 8(B) shows a receiver. Unlike in the embodiments of FIG. 6 and FIG. 7, a total number k of MACs is different from a total number n of PHYs. Some parts of the MACs, i.e., MAC 0 and MAC 1, are one-to-one mapped to PHYs, i.e., PHY 0 and PHY 1. A part of the MACs, i.e., MAC k−1, is mapped to a plurality of PHYs, i.e., PHY n−2 and PHY n−1.

Figure 9:
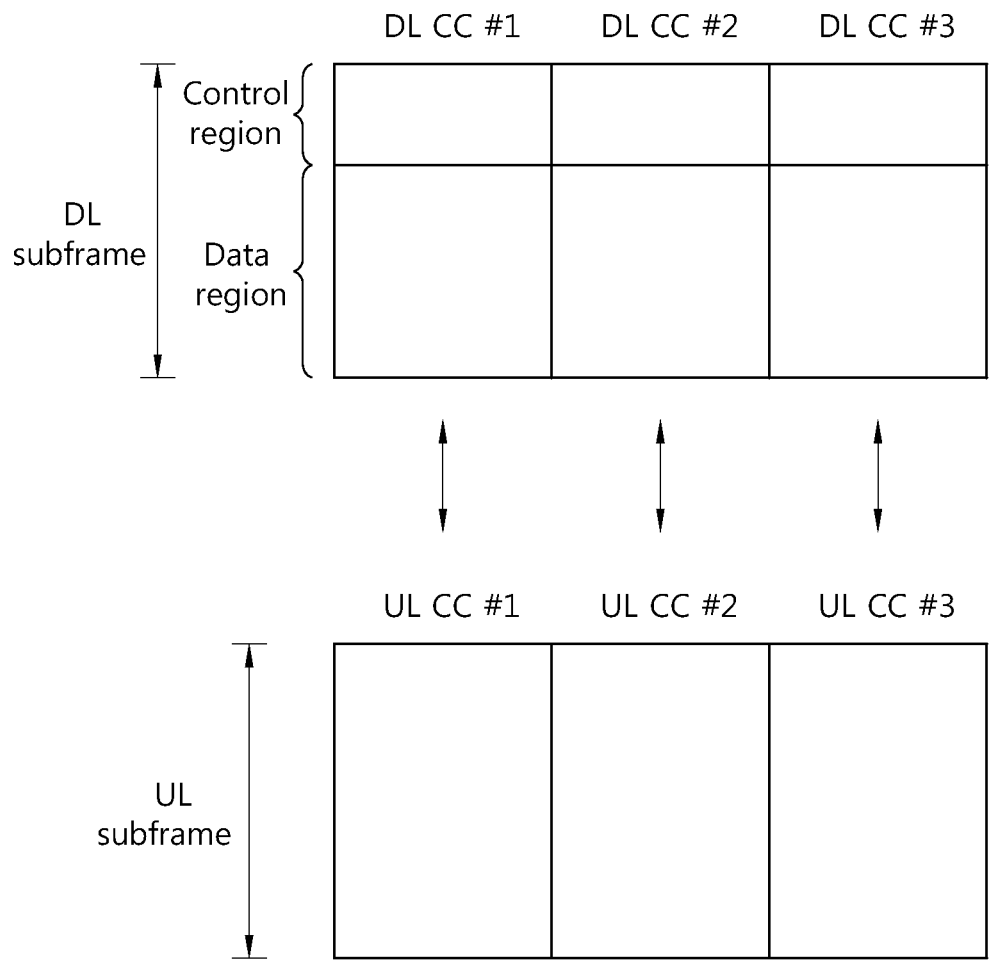
FIG. 9 shows an example of multiple carriers.

FIG. 9 shows an example of multiple carriers. Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC.

One DL CC may correspond to one cell. When the UE receives a service provided from a plurality of DL CCs, a plurality of serving cells may exist.

The CC can be defined with a center frequency and a bandwidth. According to the section 5.7.3 of 3GPP TS 36.101 V8.7.0 (2009-09), a UL frequency and a DL frequency in 3GPP LTE are designated by an E-UTRA absolute radio frequency channel number (EARFCN). The center frequency of each CC (or cell) can be designated by the EARFCN.

Two methods are possible as CC scheduling.

In a first method, a fixed CC linkage is utilized. The CC linkage implies a mapping relation between a DL CC in which a PDCCH for carrying a UL grant is transmitted and a UL CC scheduled by the UL grant. Alternatively, the CC linkage may be a mapping relation between a DL CC (or UL CC) in which data for HARQ is transmitted or a UL CC (or DL CC) in which an HARQ ACK/NACK signal is transmitted. A UL grant is transmitted through the DL CC. A UL transport block is transmitted by using the UL grant through a UL CC linked to the DL CC. Since a UL CC to be scheduled by the UL grant can be determined through a predefined CC linkage, additional signaling is not necessary.

In a second method, a CC to be scheduled is directly designated. For example, a PDCCH and a PDSCH are transmitted in different DL CCs, or a PUSCH is transmitted on a UL CC not linked to a DL CC in which the PDCCH is transmitted. This is called cross-carrier scheduling.

Figure 10:
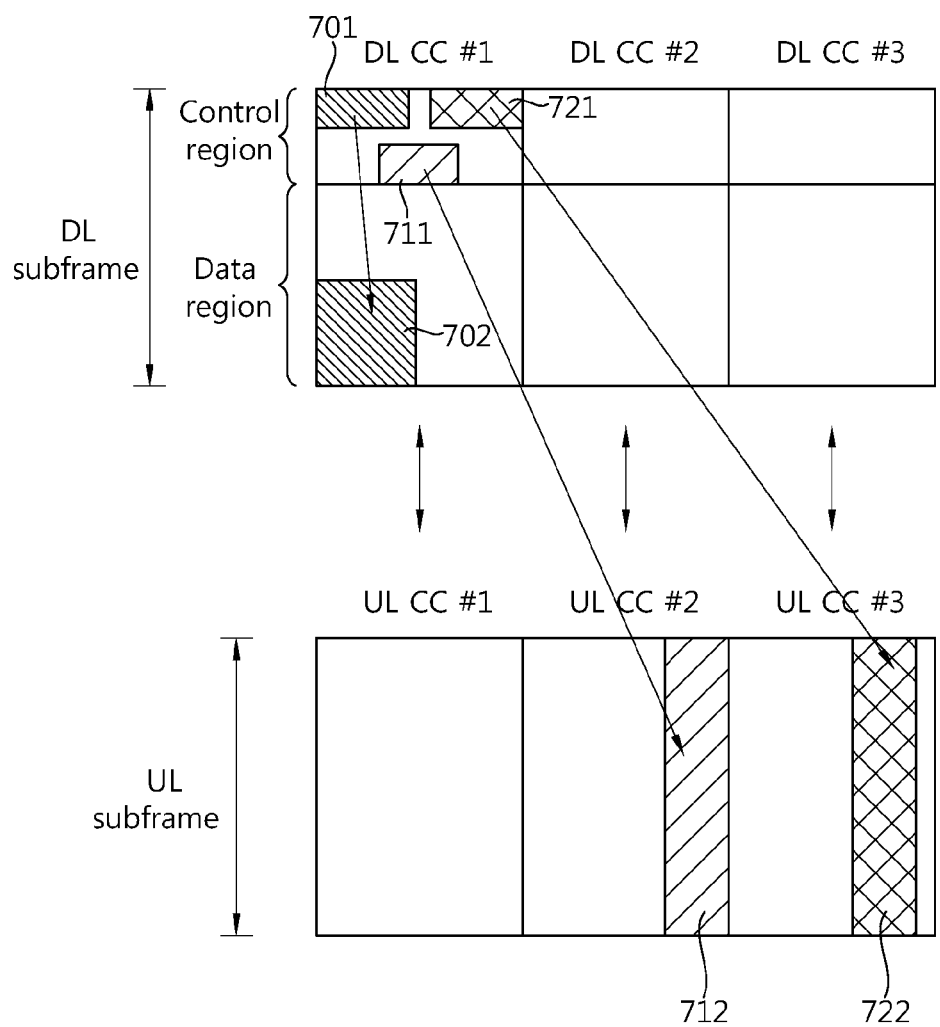
FIG. 10 shows an example of cross-carrier scheduling.

FIG. 10 shows an example of cross-carrier scheduling. It is assumed that a DL CC #1 is linked to a UL CC #1, a DL CC #2 is linked to a UL CC #2, and a DL CC #3 is linked to a UL CC #3.

A $1^{st}$ PDCCH 710 of the DL CC #1 carries DCI (or a DL grant) for a PDSCH 702 of the same DL CC #1. A $2^{nd}$ PDCCH 711 of the DL CC #1 carries DCI (or a UL grant) for a PDSCH 712 of the DL CC #2. A $3^{rd}$ PDCCH 721 of the DL CC #1 carries DCI (or a UL grant) for a PUSCH 722 of the UL CC #3.

For cross-carrier scheduling, the DCI of the PDCCH may include a carrier indicator field (CIF). The CIF designates a DL CC or a UL CC scheduled through the DCI. The CIF may include an index of a UL CC or an index of a DL CC scheduled through the DCI. For example, the $2^{nd}$ PDCCH 711 may include a CIF indicating the UL CC #2. The $3^{rd}$ PDCCH 721 may include a CIF indicating the UL CC #3.

When PHICH group mapping is performed based on the conventional 3GPP LTE in the multi-carrier system, ambiguity may occur.

Assume that a PHICH is transmitted in a DL CC in which a UL grant is transmitted. In an $n^{th}$ subframe, a $2^{nd}$ PDCCH 711 of a DL CC #1 carries a UL grant for a PUCCH 712 of a UL CC #2, and a $3^{rd}$ PDCCH 721 of the DL CC #1 carries a UL grant for a PUSCH 722 of a UL CC #3. Therefore, two PHICHs are transmitted for the PUCCH 712 and the PUSCH 722 in an $(n+4)^{th}$ subframe of the DL CC #1.

However, the same PRB index can be used in the two different UL CCs, and thus the same PHICH resource can be selected.

That is, if the PUCCH 712 of the UL CC #2 and the PUSCH 722 of the UL CC #3 use the same lowest physical resource block (PRB) index $I_{PRB\_RA}^{lowest\_index}$ of a resource and the same cyclic shift parameter $n_{DMRS}$ of DMRS, then PHICH resources ($n_{PHICH}^{group}$, $n_{PHICH}^{seq}$) derived from Equation 1 above are also identical.

If PUSCHs assigned to a plurality of UL CCs have the same lowest PRB indices, collision may occur in PHICH resources. The problem of the collision of the PHICH resources can be solved by changing the cyclic shift parameter $n_{DMRS}$.

However, due to the introduction of UL MIMO, cyclic shift of a reference signal is more frequently used, and a value Ng which is signaled by an RRC message is set smaller than a current system load, which may result in a shortage of the PHICH resources. Therefore, the collision of the PHICH resource may not be sufficiently prevented by scheduling the cyclic shift parameter of the DMRS.

Now, a method of obtaining a plurality of PHICH resources in a multi-carrier system will be described.

For clear explanation, it is assumed that there are two UL CCs, i.e., a UL CC #1 and a UL CC #2. It is assumed that each UL CC uses 15 PRBs indexed with PRB indices 0 to 14, and there are four PHICH groups 0 to 3. Therefore, $N_{PHICH}^{group}=4$, and $N_{RB}^{UL}=15$. In addition, it is assumed that $n_{DMRS}=0$ for all UL CCs.

Figure 11:
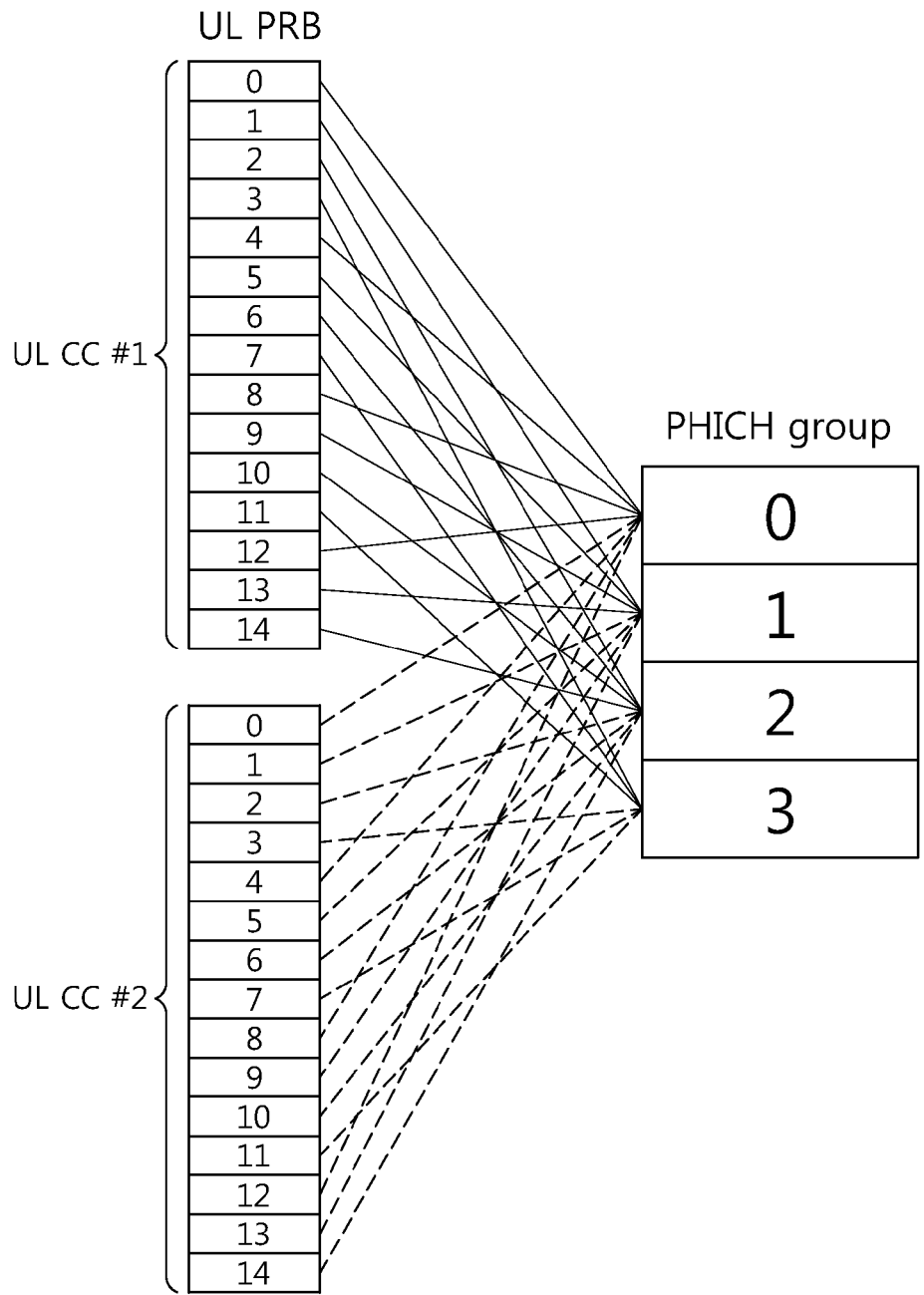
FIG. 11 shows an example of PHICH resource mapping.

FIG. 11 shows an example of PHICH resource mapping.

Since the number of PHICH groups is always less than the number of PRBs of a single UL CC, each PHICH group is mapped to a plurality of UL PRB indices. Each of the PHICH groups 0, 1, and 2 is mapped to four UL indices for each UL CC. However, a last PHICH group, i.e., the PHICH group 3, is mapped to three UL indices for each UL CC.

Herein, 'mapping' implies that a UL PRB index is used as a lowest PRB index used in a PUSCH, and a corresponding PHICH group is obtained. For example, when the PRB index 4 of the UL CC #1 is the lowest PRB index, the PHICH group 0 is obtained.

As shown in Equation 1, since the PHICH group is obtained by using a modular operation of $N_{PHICH}^{group}$, PRB indices are not identically mapped to the respective PHICH groups. If there are a plurality of UL CCs, a discrepancy in the number of PRB indices to be mapped to each of the PHICH groups may increase.

Figure 12:
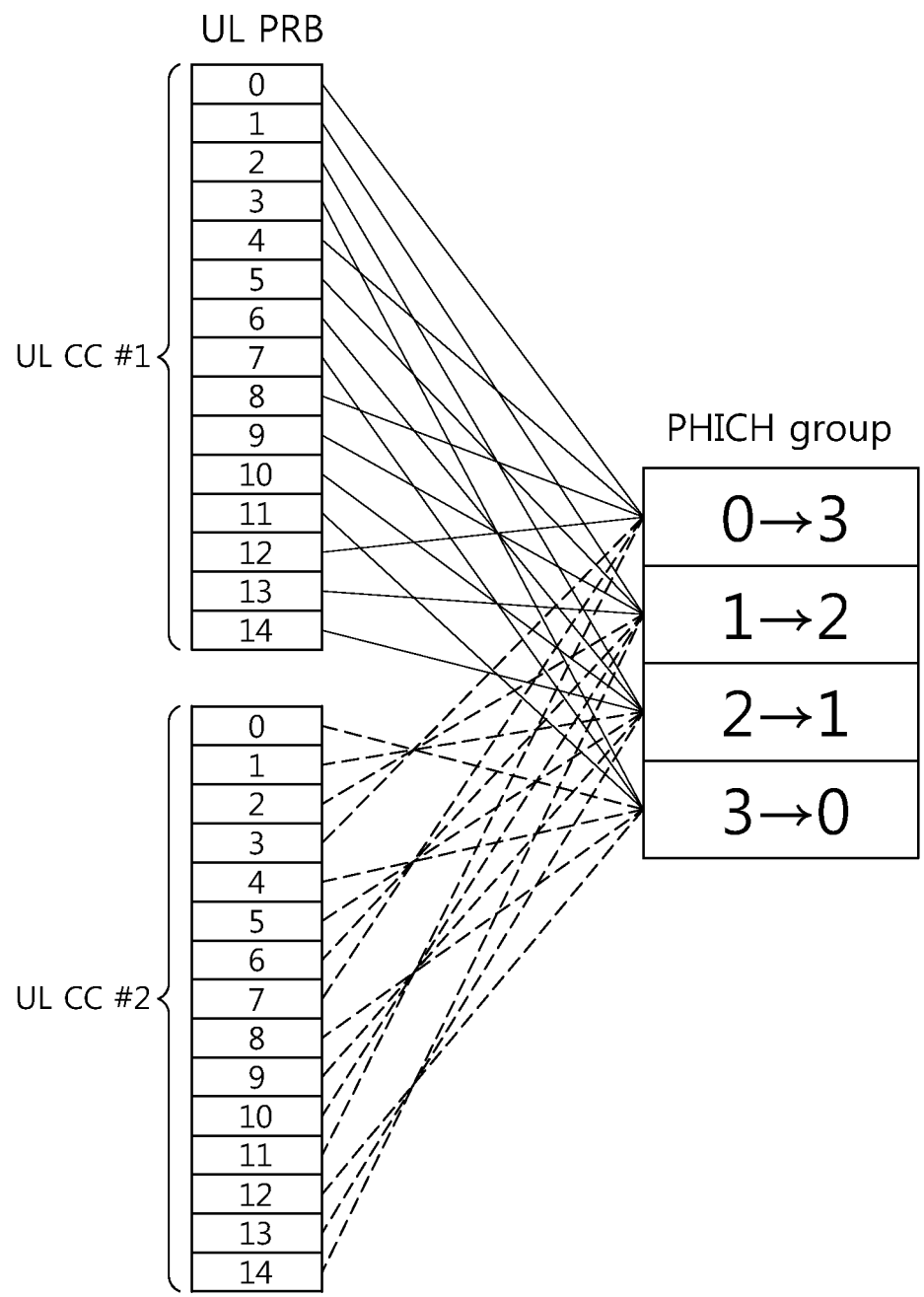
FIG. 12 shows PHICH resource mapping according to an embodiment of the present invention.

FIG. 12 shows PHICH resource mapping according to an embodiment of the present invention.

PRB indices of a UL CC #1 are mapped sequentially to PHICH groups (or PHICH resources). Further, PRB indices of a UL CC #2 are mapped sequentially in a reverse order of PHICH groups (or PHICH resources) which are mapped to the UL CC #1. That is, the PRB indices of the UL CC #1 are mapped sequentially to PHICH groups 0, 1, 2, and 3, and PRB indices of the UL CC #2 are mapped sequentially to PHICH groups 3, 2, 1, and 0.

Assume that a PHICH resource of the UL CC #1 is ($n1_{PHICH}^{group}$, $n1_{PHICH}^{seq}$), and a PHICH resource of the UL CC #2 is ($n2_{PHICH}^{group}$, $n2_{PHICH}^{seq}$). When ($n1_{PHICH}^{group}$, $n1_{PHICH}^{seq}$) is obtained by Equation 1 above, ($n2_{PHICH}^{group}$, $n2_{PHICH}^{seq}$) can be expressed by Equation 3 below.

$$n2_{PHICH}^{group}=N_{PHICH}^{group}-n1_{PHICH}^{group}-1$$
$$n2_{PHICH}^{seq}=n1_{PHICH}^{seq} \quad \text{[Equation 3]}$$

By changing an order of PHICH groups mapped to PRB indices of each UL CC, a probability of overlapping of the PHICH resources can be decreased.

For another example, a start point of the PHICH group mapped to each UL CC can be designated. It is assumed that a start point of an $m^{th}$ UL CC is $\beta_m$. $\beta_m$ may have a value of $\{0, 1, \ldots, N_{PHICH}^{group}-1\}$.

It is assumed that a start point of the UL CC #1 is fixed to 0, and the start point of the UL CC #1 is denoted by $\beta$. ($n1_{PHICH}^{group}$, $n1_{PHICH}^{seq}$) can be obtained by Equation 1 above, and ($n2_{PHICH}^{group}$, $n2_{PHICH}^{seq}$) can be expressed by Equation 4 below.

$$n2_{PHICH}^{group}=(n1_{PHICH}^{group}+\beta) \bmod N_{PHICH}^{group}$$

$$n2_{PHICH}^{seq}=n1_{PHICH}^{seq} \quad \text{[Equation 4]}$$

The start point β can be applied to obtain a PHICH group and/or an orthogonal sequence index.

Information of the start point can be reported by a BS to a UE by using system information, a PDCCH, and/or an RRC message.

Figure 13:
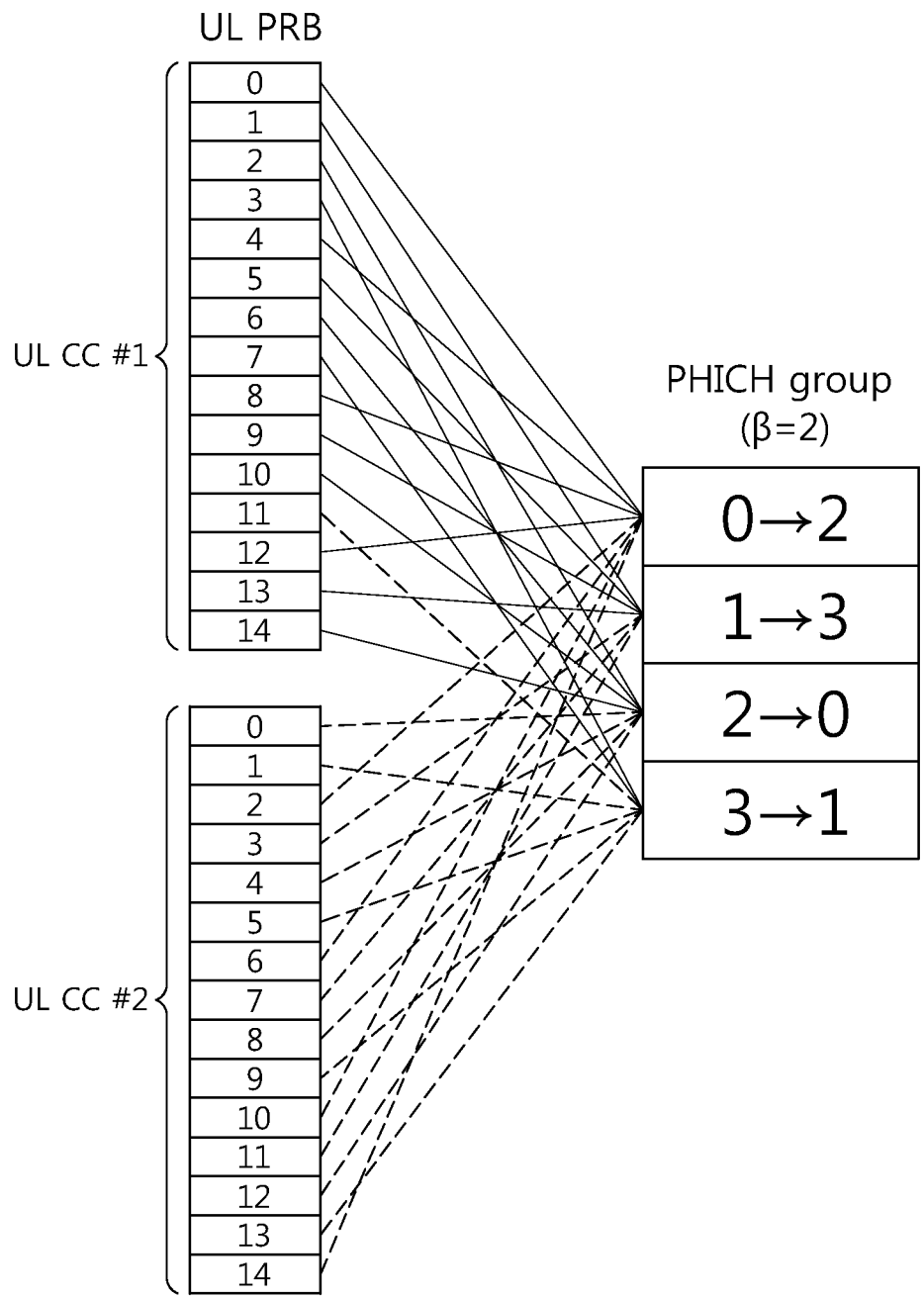
FIG. 13 shows PHICH resource mapping according to another embodiment of the present invention.

FIG. 13 shows PHICH resource mapping according to another embodiment of the present invention. In this example, an embodiment of changing an order of a PHICH group and an embodiment of changing a start point of the PHICH group is combined.

Regarding a UL CC #1, the PHICH resource is obtained in the same manner as the conventional 3GPP LTE. Regarding a UL CC #2, the PHICH group is mapped in a reverse order, and a start point β=2 is shown for example.

In the UL CC #1, backward compatibility is guaranteed since the PHICH resource is obtained in the same manner as the conventional 3GPP LTE. In the UL CC #2, the PHICH resource is mapped to decrease a probability of overlapping of PHICH resources with the UL CC #1.

Whether to apply or activate the changed PHICH resource mapping can be reported by a BS to a UE by using system information, a PDCCH, and/or an RRC message.

The PHICH resource mapping may vary depending on a UL CC index $n_{CC}^{UL}$. The UL CC index $n_{CC}^{UL}$ may be cell-specific or UE-specific. For example, a UL CC having an even index uses the existing PHICH resource mapping of Equation 1, and a UL CC having an odd index uses the changed PHICH resource mapping. The other way around is also possible.

A plurality of PHICH resource mappings can be used. It is assumed that $1^{st}$ PHICH resource mapping is PHICH resource mapping (q=0) shown in Equation 1, $2^{nd}$ PHICH resource mapping is reverse-order PHICH resource mapping (q=1), and $3^{rd}$ PHICH resource mapping is PHICH resource mapping (q=2) in which a star point is changed. PHICH resource mapping of each UL CC can be determined such as $q=n_{CC}^{UL} \bmod Q$. Herein, Q denotes the number of available PHICH resource mappings.

Figure 14:
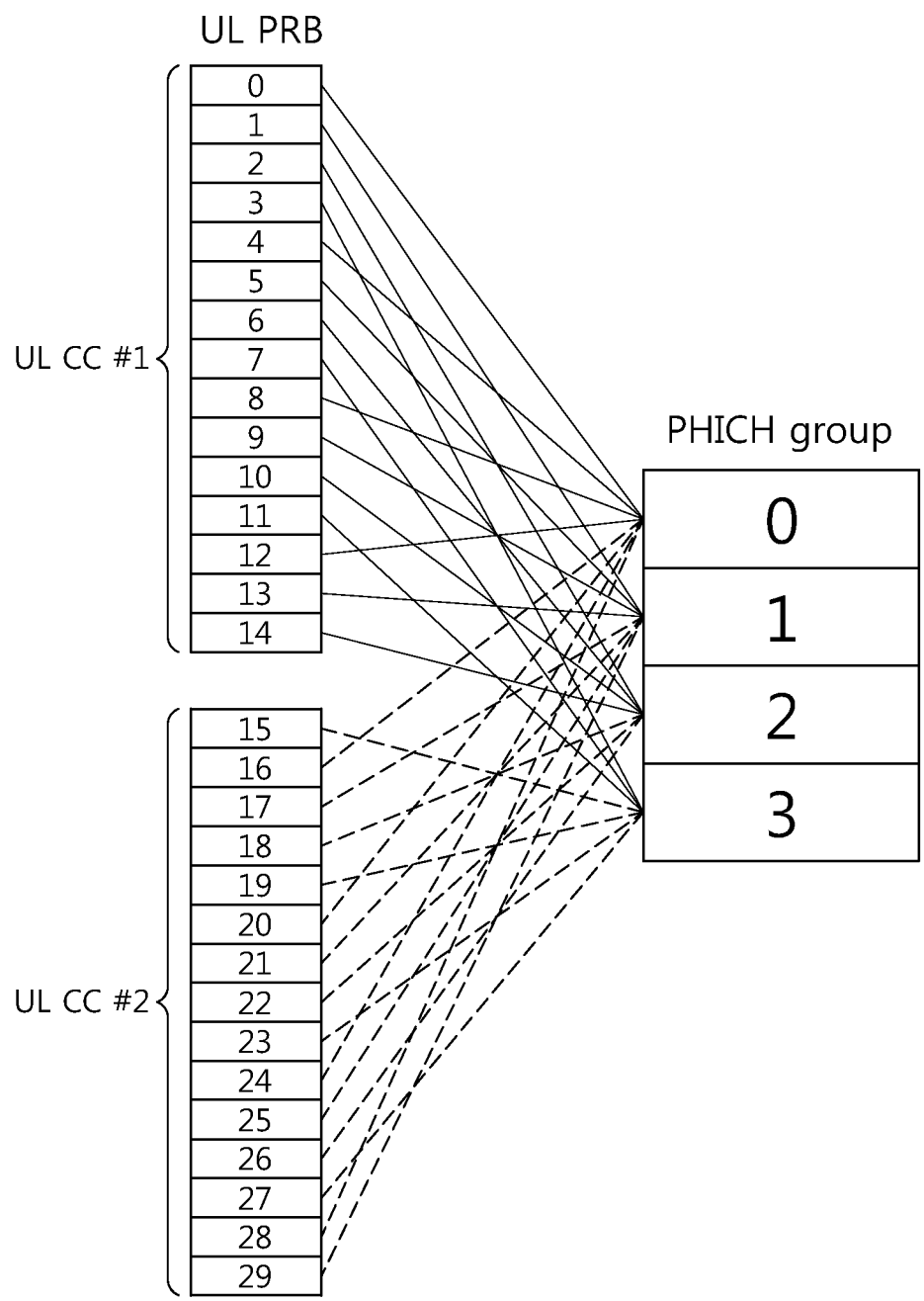
FIG. 14 shows PHICH resource mapping according to another embodiment of the present invention.

FIG. 14 shows PHICH resource mapping according to another embodiment of the present invention.

PRB indices of a plurality of UL CCs are continuously arranged. PRBs of a UL CC #1 have indices 0 to 14, and PRBs of a UL CC #2 have indices 15 to 29.

Therefore, since a PRB index is different even if each UL CC has the same PRB, it can be mapped to a different PHICH resource for each UL CC.

Meanwhile, an offset based on an index of a UL CC can be added to Equation 1 to obtain the PHICH resource. That is, the PHICH resource can be obtained by Equation 5 below.

$$n_{PHICH}^{group} = (I_{PRB_{RA}}^{lowest\_index} + n_{DMRS} + I_{CIF}^{group}) \bmod N_{PHICH}^{group}$$
$$n_{PHICH}^{seq} = (\lfloor I_{PRB_{RA}}^{lowest\_index} / N_{PHICH}^{group} \rfloor + n_{DMRS} + I_{CIF}^{seq}) \bmod 2N_{SF}^{PHICH}$$ [Equation 5]

Herein, $I_{CIF}^{group}$ is an offset of a PHICH group based on a CIF, and $I_{CIF}^{seq}$ is an offset of an orthogonal sequence index based on the CIF. Any one of $I_{CIF}^{group}$ and $I_{CIF}^{seq}$ may be 0.

When applying the aforementioned changed PHICH group mapping, a more gain can be obtained than a case where cyclic shift of DMRS is not enough. Therefore, the BS may allow to apply PHICH mapping changed after a specific subframe, or may allow to apply PHICH mapping changed during a specific subframe duration.

Figure 15:
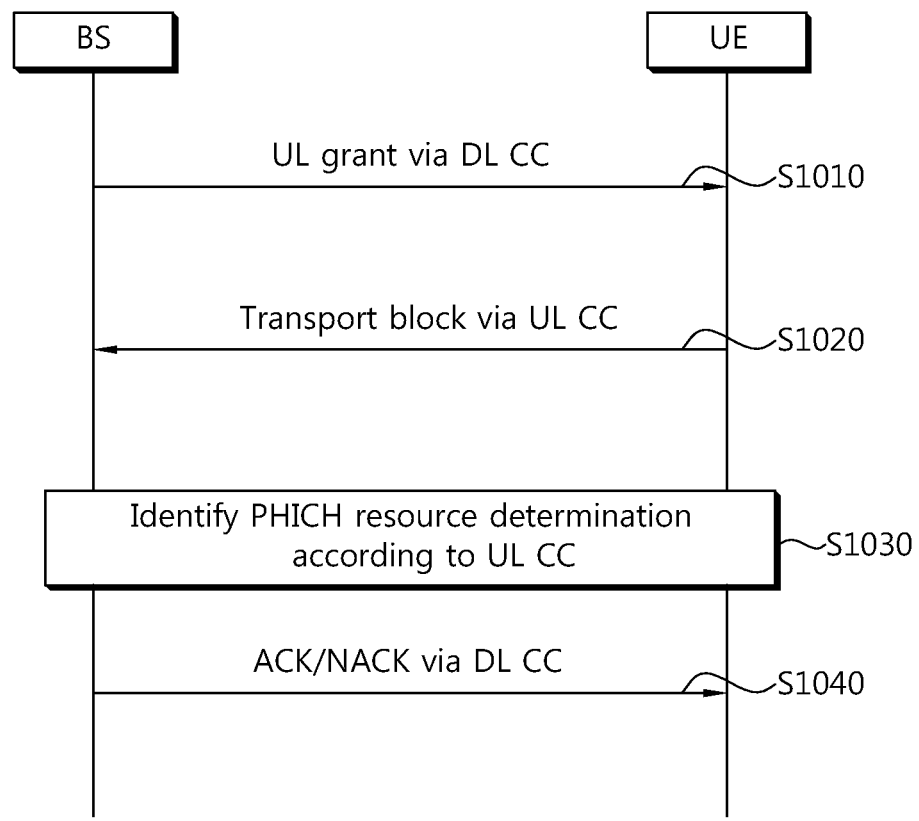
FIG. 15 is a flowchart showing a method of performing an HARQ according to an embodiment of the present invention.

FIG. 15 is a flowchart showing a method of performing an HARQ according to an embodiment of the present invention.

A UE receives a UL grant including a UL resource allocation from a BS through a DL CC (step S1010).

The UE transmits a transport block to the BS through a PUSCH of a UL CC by using the UL resource allocation (step S1020).

The UE and the BS determine or identify a PHICH resource according to a UL CC (step S1030). The UE can identify a PHICH resource according to the PHICH resource mapping method based on the aforementioned embodiments of FIG. 12 to FIG. 14.

The UE receives an ACK/NACK signal (i.e., a reception acknowledgement) for the transport block from the BS through a PHICH of a DL CC (step S1040). A DL CC in which the PHICH is transmitted may be the same as a DL CC in which a UL grant is transmitted.

Now, PHICH resource mapping in SPS will be described.

In 3GPP LTE, when the SPS is activated, a cyclic shift parameter of DMRS is fixed to 0. Therefore, a probability of collision of PHICH resources is further increased when using a plurality of UL CCs.

To avoid collision of the PHICH resources, the following methods can be taken into account.

When the SPS is activated, a cyclic shift parameter other than 0 can be assigned to each UE. The BS can report the assigned cyclic shift parameter to the UE by using an RRC message or a PDCCH for activation.

According to the section 5.5.2 of 3GPP TS 36.211 V8.7.0 (2009-05), DMRS transmitted in a PUSCH is generated by cyclically shifting a base sequence by a cyclic shift α. In a slot $n_s$, the cyclic shift α is given by $\alpha = 2\pi n_{cs}/12$.

$$n_{cs} = (n_{DMRS}^{(1)} + n_{DMRS} + n_{PRS}(n_s)) \bmod 12$$ [Equation 6]

Herein, $n_{DMRS}^{(1)}$ is a parameter given by a higher layer, and $n_{DMRS}$ is a cyclic shift parameter included in a UL grant corresponding to PUSCH transmission.

In the above description, the cyclic shift parameter $n_{DMRS}$ is a parameter used to generate actual DMRS, and also is a parameter used to obtain a PHICH resource.

However, in order to avoid collision of PHICH resources and to maintain backward compatibility with legacy systems, a cyclic shift parameter used to generate DMRS and a cyclic shift parameter (i.e., a virtual cyclic shift parameter $nv_{DMRS}$) used to obtain a PHICH resource can be used by additionally defining these parameters.

That is, if the SPS is activated, the UE sets the DMRS used for PUSCH transmission to $n_{DMRS}=0$ equally to the conventional case. However, the virtual cyclic shift parameter $nv_{DMRS}$ used to obtain the PHICH resource is obtained by using an additionally defined method. For example, $n_{DMRS}$ of Equation 1 is replaced with $nv_{DMRS}$.

Information on the virtual cyclic shift parameter $nv_{DMRS}$ can be reported by the BS to the UE by using an RRC message or a UL grant on a PDCCH. The information can be given by a value of the virtual cyclic shift parameter $nv_{DMRS}$ or an offset from the parameter $n_{DMRS}$.

The virtual cyclic shift parameter $nv_{DMRS}$ can be determined based on a value of CIF and/or $n_{DMRS}$. When a CC index designated by the CIF is denoted by CI, the virtual cyclic shift parameter $nv_{DMRS}$ can be defined in various manners as follows.

$nv_{DMRS} = n_{DMRS} + CI$
$nv_{DMRS} = n_{DMRS} - CI$
$nv_{DMRS} = (n_{DMRS} * CI) \bmod$ (maximum value of $n_{DMRS}$)
$nv_{DMRS} = n_{DMRS} + CI + \text{offset}$ The virtual cyclic shift parameter $nv_{DMRS}$ can be used to obtain a PHICH group, or can be used to obtain an orthogonal sequence index. This can be expressed by the following examples.

$$n_{PHICH}{}^{group} = (I_{PRB_{RA}}{}^{lowest\_index} + nv_{DMRS}) \bmod N_{PHICH}{}^{group} \quad n_{PHICH}{}^{seq} = (\lfloor I_{PRB_{RA}}{}^{lowest\_index} / N_{PHICH}{}^{group} \rfloor + nv_{DMRS}) \bmod 2N_{SF}{}^{PHICH} \quad \text{[Equation 7]}$$

$$n_{PHICH}{}^{group} = (I_{PRB_{RA}}{}^{lowest\_index} + n_{DMRS}) \bmod N_{PHICH}{}^{group} \quad n_{PHICH}{}^{seq} = (\lfloor I_{PRB_{RA}}{}^{lowest\_index} / N_{PHICH}{}^{group} \rfloor + nv_{DMRS}) \bmod 2N_{SF}{}^{PHICH} \quad \text{[Equation 8]}$$

$$n_{PHICH}{}^{group} = (I_{PRB_{RA}}{}^{lowest\_index} + nv_{DMRS}) \bmod N_{PHICH}{}^{group} \quad n_{PHICH}{}^{seq} = (\lfloor I_{PRB_{RA}}{}^{lowest\_index} / N_{PHICH}{}^{group} \rfloor + n_{DMRS}) \bmod 2N_{SF}{}^{PHICH} \quad \text{[Equation 9]}$$

Similarly to UL SPS, when an ACK/NACK signal for a transport block transmitted in an $n^{th}$ subframe without a UL grant is received in an $(n+k_{PHICH})^{th}$ subframe, a parameter $n_{DMRS}$ for obtaining the PHICH resource can be designated to a value other than 0. Alternatively, the parameter $n_{DMRS}$ can use a most-recently used value. The parameter $n_{DMRS}$ can be determined based on a UL CC index.

Figure 16:
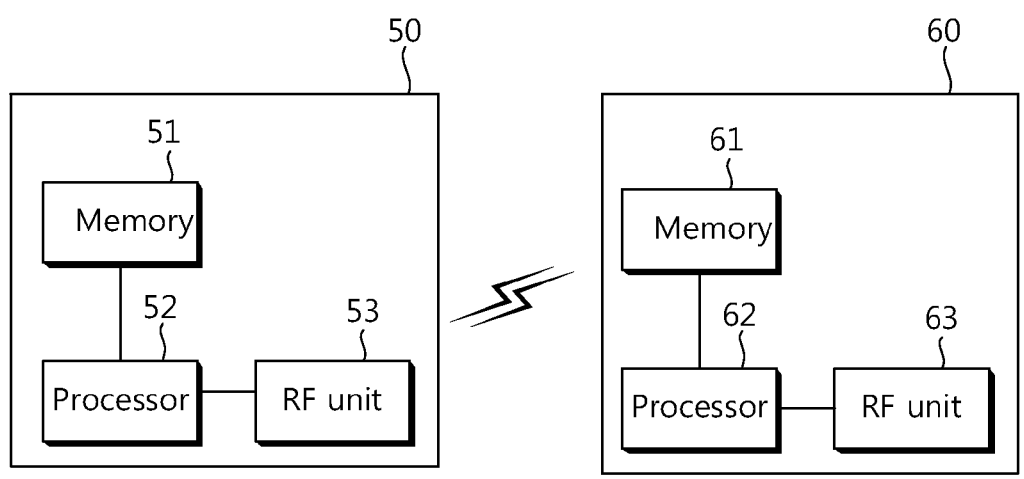
FIG. 16 is a block diagram showing a wireless communication system according to an embodiment of the present invention.

FIG. 16 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed HARQ operation. The processor 51 can implement an operation of the BS 50 according to the embodiments of FIG. 12 to FIG. 15. The processor 51 allocates a PHICH resource, and transmits a reception acknowledgement through a PHICH.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed HARQ operation. The processor 61 can implement an operation of the UE 60 according to the embodiments of FIG. 12 to FIG. 15. The processor 61 transmits a transport block through a PUSCH, and receives a reception acknowledgement through a PHICH.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method of performing an uplink hybrid automatic repeat request (HARQ) in a wireless communication system, the method comprising:
   receiving, by a user equipment, an uplink grant including an uplink resource allocation and a carrier indicator field, through a downlink component carrier;
   transmitting, by the user equipment, at least one transport block on a physical uplink shared channel (PUSCH) through an uplink component carrier indicated by the carrier indicator field among a plurality of uplink component carriers by using the uplink resource allocation; and
   receiving, by the user equipment, a ACK/NACK signal for the transport block through a physical hybrid-ARQ indicator channel (PHICH),
   wherein a resource of the PHICH is determined according to the carrier indicator field which is used to determine the uplink component carrier for transmitting the transport block among the plurality of uplink component carriers,
   wherein the resource of the PHICH is identified by a PHICH group and an orthogonal sequence index in a PHICH group, and
   wherein resources of the PUSCH are mapped to the PHICH group in a forward direction.

2. The method of claim 1, wherein if an index of the uplink component carrier is an even number, the resources of the PUSCH are mapped to the PHICH group in the forward direction, and if an index of the uplink component carrier is an odd number, the resources of the PUSCH are mapped to the PHICH group in the reverse direction.

3. The method of claim 1, wherein a start point at which the resources of the PUSCH are mapped to the PHICH group differs depending on the uplink component carrier.

4. The method of claim 1, wherein the PUSCH resource is a physical resource block (PRB) having a lowest index among PRBs used for transmission of the PUSCH.

5. An apparatus for performing an uplink hybrid automatic repeat request (HARQ) in a wireless communication system, the apparatus comprising:
   a radio frequency (RF) unit configured to transmit and receive a radio signal; and
   a processor coupled to the RF unit and configured to:
      receive an uplink grant including an uplink resource allocation and a carrier indicator field, through a downlink component carrier;
      transmit at least one transport block on a physical uplink shared channel (PUSCH) through an uplink component carrier indicated by the carrier indicator field among a plurality of uplink component carriers by using the uplink resource allocation; and
      receive a ACK/NACK signal for the transport block through a physical hybrid-ARQ indicator channel (PHICH),
      wherein a resource of the PHICH is determined according to the carrier indicator field which is used to determine the uplink component carrier for transmitting the transport block among the plurality of uplink component carriers,
      wherein the resource of the PHICH is identified by a PHICH group and an orthogonal sequence index in a PHICH group, and
      wherein resources of the PUSCH are mapped to the PHICH group in a forward direction.

6. A method of performing an uplink hybrid automatic repeat request (HARQ) in a wireless communication system, the method comprising:
- receiving, by a user equipment, a semi-persistent scheduling (SPS) period from a base station;
- receiving, by the user equipment, an SPS activation from the base station;
- transmitting, by the user equipment, a transport block through a physical uplink shared channel (PUSCH) at the SPS period to the base station; and
- receiving, by the user equipment, a ACK/NACK signal for the transport block through a physical hybrid-ARQ indicator channel (PHICH) by the user equipment from the base station,
- wherein a PHICH resource used for transmission of the PHICH is identified from a PUSCH resource used for transmission of the PUSCH and an uplink component carrier through which the transport block is transmitted.

7. The method of claim 6, wherein the PHICH resource includes a PHICH group and an orthogonal sequence index in the PHICH group.

8. The method of claim 7, wherein at least one of the PHICH group and the orthogonal sequence index is identified based on the PUSCH resource and an index of the uplink component carrier.

* * * * *